United States Patent [19]

Galbani

[11] Patent Number: 4,997,336

[45] Date of Patent: Mar. 5, 1991

[54] METHOD AND APPARATUS FOR WITHDRAWING, TRANSFERRING AND ARRANGING TEXTILE BOBBINS

[75] Inventor: Benito Galbani, Pordenone, Italy

[73] Assignee: Savio S.p.A., Pordenone, Italy

[21] Appl. No.: 244,080

[22] Filed: Sep. 13, 1988

[30] Foreign Application Priority Data

Sep. 25, 1987 [IT] Italy ................... 22028 A/87

[51] Int. Cl.⁵ .................................................. B65G 57/18
[52] U.S. Cl. .................................. 414/790.2; 414/399;
414/684; 414/751; 414/790.7; 414/792.6;
414/792.9; 414/794.6; 414/911
[58] Field of Search ............... 414/399, 684, 751, 753,
414/729, 744.1, 744.3, 789.9, 790.3, 789.9,
790.2, 790.7, 792.5, 792.6, 792.9, 794.5, 794.6,
911; 901/7, 16; 68/210; 242/35.5 A

[56] References Cited

U.S. PATENT DOCUMENTS

| | | | |
|---|---|---|---|
| 4,555,215 | 11/1985 | Raasch et al. | 414/911 X |
| 4,558,776 | 12/1985 | Lattion | 414/792.6 X |
| 4,729,709 | 3/1988 | Raasch | 414/792.6 X |
| 4,763,773 | 8/1988 | Kawarabashi et al. | |
| 4,810,155 | 3/1989 | D'Agnolo | 414/911 X |
| 4,820,101 | 4/1989 | Fenn | 414/789.9 X |

FOREIGN PATENT DOCUMENTS

| | | |
|---|---|---|
| 3244925 | 6/1984 | Fed. Rep. of Germany . |
| 3418814 | 11/1985 | Fed. Rep. of Germany . |
| 3441778 | 5/1986 | Fed. Rep. of Germany . |
| 213668 | 10/1985 | Japan . |
| 1239441 | 7/1971 | United Kingdom ............. 414/794.5 |

Primary Examiner—H. Grant Skaggs
Assistant Examiner—Boris Milef
Attorney, Agent, or Firm—Hedman, Gibson, Costigan & Hoare

[57] ABSTRACT

This invention is an apparatus for withdrawing yarn bobbins, from withdrawal preparation tracks which carry the bobbins and for transferring the withdrawn bobbins into a wheel-mounted container. When the bobbins are transferred to the container they lie in a predetermined ordered arrangement which is related to the bobbin shape and size. The apparatus comprises vertically and angularly displaceable roller tracks which are on a mobile slide or support for preparing the bobbins for handling. These are automatically centered because of a substantially V-shaped arrangement of the supporting roller tracks. The apparatus also comprises a gripping device for simultaneously withdrawing and transferring several bobbins prepared on a roller track. This device is in the form of a multi-engagement gripper which is provided with various pairs of jaws for external gripping. It is also provided with a pendant rod-shaped arm which translates along two axes. The apparatus further comprises a control unit based on a miniprocessor into which a set of operating data is fed by a keyboard to obtain programmable computerized positioning.

4 Claims, 3 Drawing Sheets

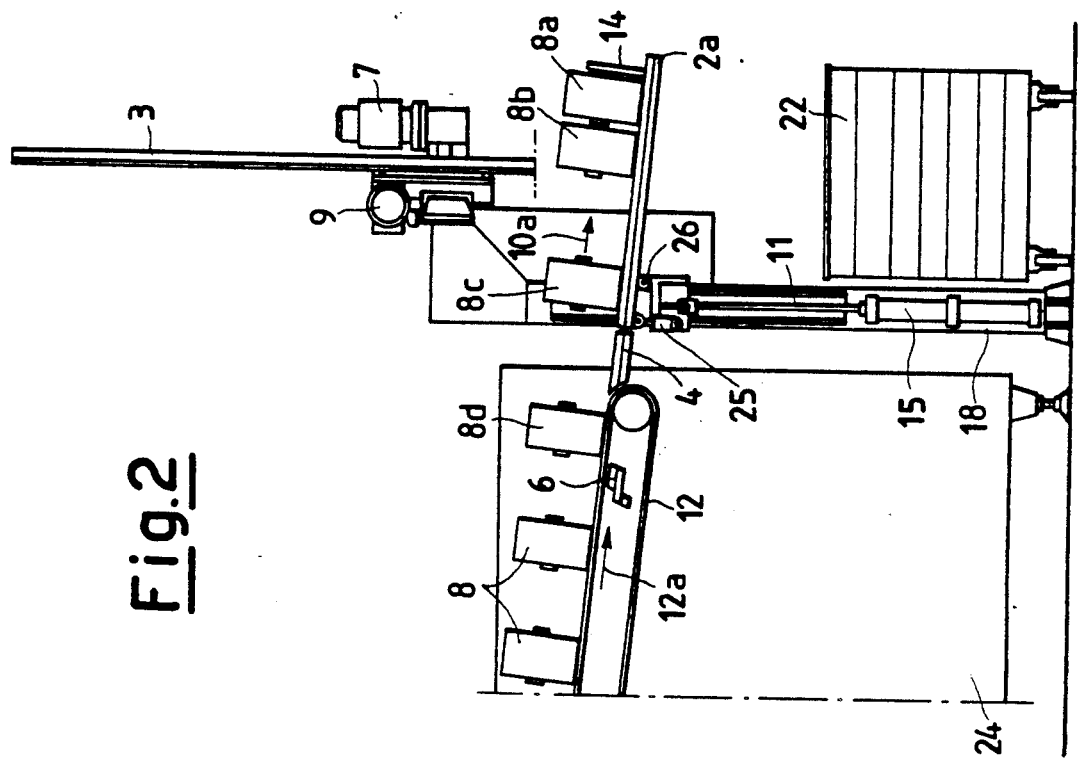
_Fig.2_
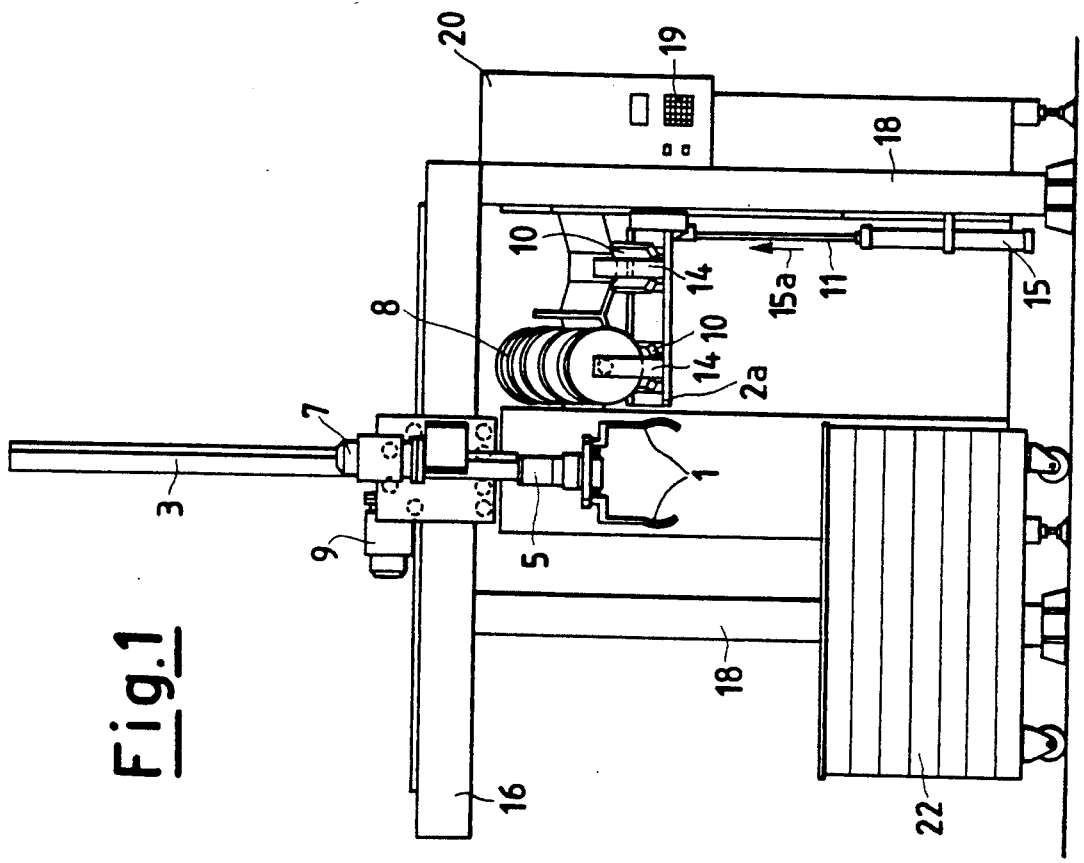
_Fig.1_

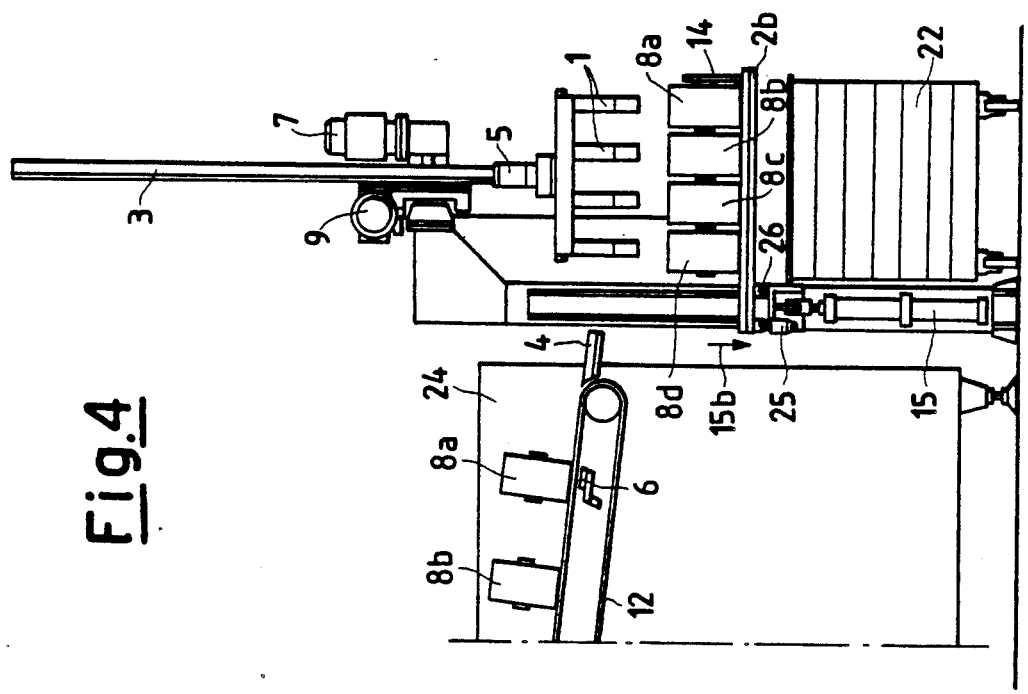
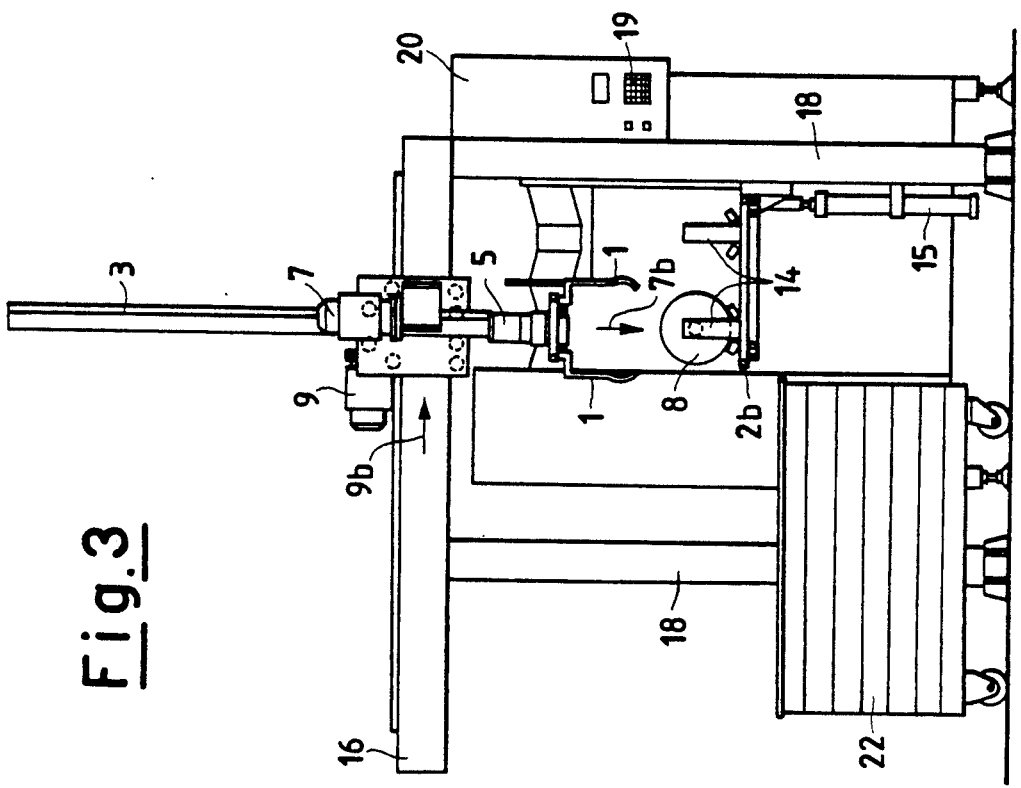

METHOD AND APPARATUS FOR WITHDRAWING, TRANSFERRING AND ARRANGING TEXTILE BOBBINS

The invention relates to an apparatus and method for withdrawing, transferring and arranging in an ordered manner in bins or containers a plurality of conical yarn bobbins removed from a textile machine by conveyor belts.

More particularly, the invention relates to the removal of cross-wound conical bobbins originating from a textile winding machine and their arrangement in several layers in an ordered manner in wheel-mounted containers, bins or other means, by which they are conveyed along sometimes lengthy paths to subsequent processing regions or to the storage system.

At the end of the spinning process, the yarn product is generally available in the form of cross-wound bobbins. These bobbins can be of any shape and size, and in the description and claims given hereinafter they are known for simplicity as textile bobbins, cross-wound bobbins or yarn packages, there terms being used interchangeably.

In textile, woollen or cotton mills, the removal of bobbins from winding machines or rotor spinning machines is an operation which within the framework of further rationalisation needs to be mechanised and automated. In this respect, in spite of the very high level of machine automation, the bobbin removal conveyor belt, or belts in the case of rotor spinning machines operating on both faces, and which transfer the bobbins distributed on them along the machine, still require manual labour for removing the bobbins from their ends and depositing them in bins or boxes. The object of the present invention is to completely eliminate the manual operations involved in the withdrawal, transfer and orderly storage of bobbins, so as to arrange them in a simple and rational manner for subsequent internal or external transfer. A further object is to solve the manipulation problem in an optimum manner in terms of operational efficiency, constructional economy and operational reliability. In the known art, using a manual procedure the operator responsible for discharging the bobbins withdraws them from the conveyor belt and inserts them into a collection bin, or alternatively the bobbins handled by the conveyor belt are poured randomly into containers located under its end. In this latter case the bobbins fall freely into the bin container, and the impact is such as to damage the outer yarn layer with consequent product quality deterioration. After this random storage, considerable labour is required in both the said methods to extract them for the subsequent production stages. From the aforegoing it is apparent that the current method and plants require considerable manual labour, with its high inherent cost. Moreover, this represents heavy and repetitive work. Some semiautomatic or automatic devices have already been proposed in an attempt to solve the problem of discharging the completely wound bobbins from textile winding machines. For example, Japanese patent application No. 169132/82 corresponding to U.S. Pat. No. 4,763,773 proposes an apparatus which provides essentially for the use of an elevating device for receiving bobbins withdrawn from a belt conveyor and conveying them one by one to an overhead conveyor or the like.

Overhead conveying by means of boat-shaped containers or the like requires a complicated internal transport system and a distribution system which is difficult to operate. In this respect a further complication of this apparatus for discharging bobbins from a rotor spinning machine and/or winding machine is the cost of the handling and automation system for the downstream areas to which the bobbins are to be fed.

In addition, if an analysis is made of the best relationship between the conveyor belt speed, the pitch of the boat-like containers and the lifting speed of the bobbin elevator, the individual bobbin withdrawal time is found to be somewhat high and the entire system somewhat complicated and costly. A further previous proposal, German patent No. 3244925, corresponding to U.S. Pat. No. 4,555,215 is based on handling the bobbins by means of a forked gripper using a single conveyor belt. Each bobbin has its own withdrawal and transfer cycle, and the associated intermittent handling for discharge purposes means that the device is slow and therefore considerably penalises the production efficiency of the winding machine. It is a well known fact that while the conveyor belt is moving the winding units are unable to discharge (and therefore some are unable to produce), and thus the movement time involved in the conveyor belt discharge must be as short as possible. In order to reduce the overall time taken for discharging the bobbins from said conveyor belt and thus maximise the production of wound yarn along all the collection units of the entire winding machine it is therefore necessary to pick up several bobbins simultaneously.

According to the teachings of the present invention, the aforesaid drawbacks are obviated by a method and apparatus for withdrawing, transferring and arranging textile bobbins in an extremely simple, regular and rapid manner, by virtue of the fact that the operating sequence is based on simple horizontal and vertical movements. The apparatus proposed herein offers a series of advantages which on the one hand rationalise the accumulation and storage of yarn bobbins and on the other hand considerably lighten the work of the service personnel. In this respect, with the apparatus of the present invention the service personnel are required only to replace the wheel-mounted container with an empty one when filled with yarn bobbins in an ordered arrangement. This is easily done with little effort given the easy maneuverability and mobility of such wheel-mounted containers. The entire apparatus of the present invention is simple to maintain and service, this certainly being within the scope of the service personnel. There is little possibility of mechanical faults arising as the assembly undergoes only two cartesian movements, namely horizontal and vertical.

A further important advantage is the very low investment and maintenance cost of the entire apparatus. Adaptation to existing winding machines is possible at small expense. These and further advantages are attained by the apparatus of the present invention, characterised by comprising two integrated operating units, namely:

a sufficiently inclined mobile slide or support unit on which there is rigidly fixed a cradle-shaped roller track for laterally guiding the full bobbins leaving the conveyor belt. Said mobile slide, activated by a sensor-counter, translates vertically and rotates angularly to bring said bobbins into their prepared-for-withdrawal position;

a portal manipulator unit with a pendant arm provided with a multi-engagement gripper which grips and withdraws several bobbins one behind the other to transfer them from their prepared-for-withdrawal position to their ordered deposition position by means of simple vertical and horizontal translational movements generated and coordinated by drive sources controlled by a control unit.

According to one embodiment, in its two halt positions, i.e. at the beginning and end of its vertical movement, the mobile slide supporting the roller track assumes a sufficiently inclined position when it halts in front of the conveyor belt exit and a horizontal position when it halts in the withdrawal preparation position.

According to a further embodiment, the roller track of the mobile slide or support is substantially of V-shaped cross-section. According to a further embodiment, the drive sources which move the pendant arm carrying the multi-engagement gripper are activated and coordinated by a control unit based on a miniprocessor to which a series of operating data for programmable computerised positioning is fed by a control keyboard.

According to a further embodiment, the control unit which controls the entire apparatus of the present invention comprises:

- a computing centre which determines and memorises the number of bobbins to be deposited in an ordered arrangement in the individual container, progressively compares the deposited number with the memorised number, and generates an end-of-cycle signal when the number of bobbins deposited equals the number memorised;
- a luminous signalling unit in a well visible position and/or an acoustic signalling unit sensitive to the end-of-cycle signal generated by said computing centre.

With reference to the aforegoing, the drawings illustrate a preferred embodiment which is however not binding or limiting with regard to the relative positions of the components and any consequent simplifications deriving therefrom; said embodiment is described hereinafter together with the method, with reference to the accompanying figures, of which:

FIG. 1 is a diagrammatic front view of the apparatus of the present invention showing the operational configuration during the stage in which the yarn bobbins are conveyed from the main conveyor belt to the roller track, with the gripper device awaiting their completion of preparation for withdrawal;

FIG. 2 is a diagrammatic side view showing the operational configuration during the stage illustrated in FIG. 1;

FIG. 3 is a diagrammatic front view of the apparatus of the present invention showing the operational configuration on termination of preparation for and commencement of withdrawal of the yarn bobbins;

FIG. 4 is a diagrammatic side view showing the operational configuration during the stage illustrated in FIG. 3;

Figure 6:
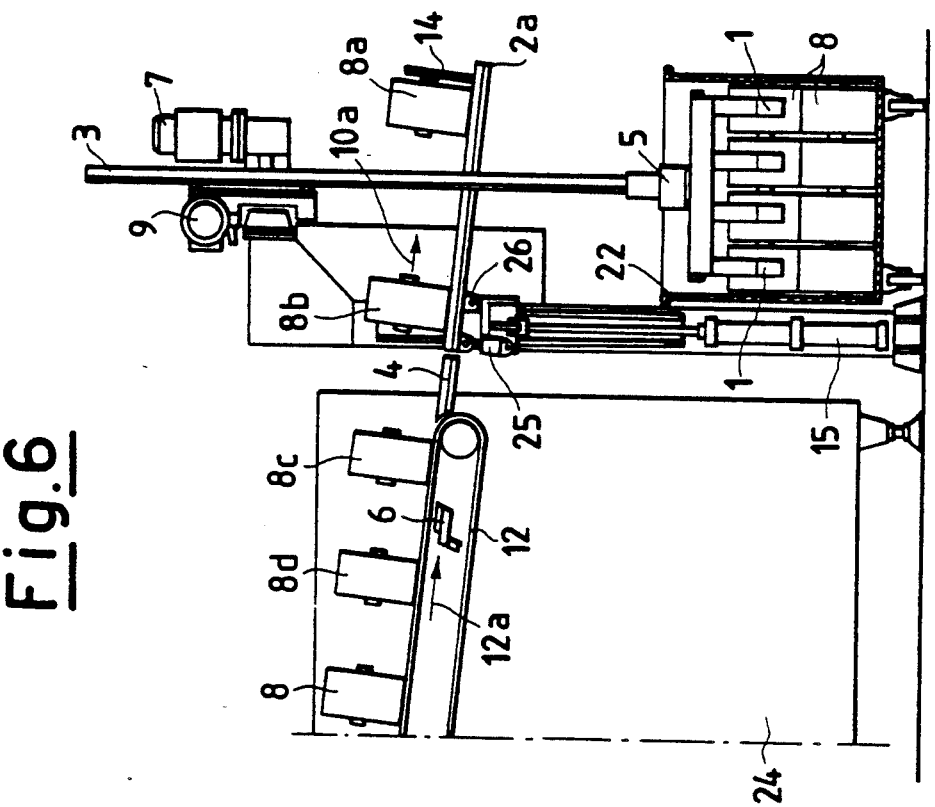
FIG. 6 is a diagrammatic side view showing the operational configuration during the stage illustrated in FIG. 5.

In the figures, equal elements or those of equal or equivalent function carry the same reference numerals. The apparatus and method are described hereinafter for the withdrawal of bobbins of any shape and size. Although cylindrical bobbins are illustrated, only small modifications are required to adapt the apparatus and method to frusto-conical bobbins, to be gripped externally in order to deposit them in ordered arrangement in the said containers.

On the accompanying drawings:

1 is the jaw or blade of the multi-engagement gripper 5, constructed of harmonic steel or similar elastic material, for clamping about the exterior of the bobbin 8 to be gripped and handled; 2a indicates the support for the withdrawal preparation roller tracks 10 when in its inclined position at rest in front of the exit of the conveyor belt 12; 2b indicates the support for the withdrawal preparation roller tracks 10 when in its horizontal lower position waiting for the multi-engagement gripper to grip the bobbins prepared for withdrawal; 3 is the pendant arm or rod, the lower end of which carries the head 5 of the multi-engagement gripper; 4 is the fixed guide portion of inclined plane to enable the bobbins 8 to be supported and to slide between the conveyor belt 12 and roller track 10; 5 is the head of the multi-engagement gripper housing internally the activators and lever systems for closing and opening the jaw blades 1; 6 is a photoelectric or similar sensor of known type which is activated on each passage of a full yarn bobbin 8, it being associated operationally with a counter of known type. Said sensor-counter assembly measures the number of passing bobbins, and when said number entering the roller track is equal to the programmed number to be prepared for withdrawal, it stops the conveyor belt 12; 7 is the drive source which vertically moves the pendant arm 3 and consequently the multi-engagement gripper; 9 is the drive source which horizontally moves the pendant arm 3 and consequently the multi-engagement gripper; 9a is an arrow indicating the direction and sense of horizontal advancement under the control action of the drive source 9 during the operating stage of ordered deposition; 7a is an arrow indicating the direction and sense of vertical advancement under the control action of the drive source 7 during the ordered deposition stage; 7b is an arrow indicating the direction and sense of vertical advancement under the control action of the drive source 7 during the withdrawal of bobbins aligned on the withdrawal preparation roller track; 9b is an arrow indicating the direction and sense of horizontal advancement under the control action of the drive source 9 during the withdrawal of bobbins aligned on the withdrawal preparation roller track; 8 is a yarn bobbin which is doffed from the spindle of the winding unit to be collected on the conveyor belt 12 which transfers it to the apparatus of the present invention in order to be arranged in ordered storage; 8a, 8b, 8c and 8d are the bobbins transferred by the belt 12 to the roller track 10 to implement the withdrawal preparation stage the rollers are provided for limiting sliding friction of the bobbins on the the guide 10; 10 is the cradle-shaped or otherwise concave or V-shaped roller track which supports and prepares the bobbins for withdrawal on the mobile support; 10a is an arrow which indicates the direction and sense of advancement of the bobbins 8 which under the action of gravity slide from the exit of the belt 12 onto the roller track and abut against each other on resting against the front stop in the form of the interception blade 14; 11 is the rod of the actuator 15; 12 is the conveyor belt by which the completely wound bobbins which have been doffed and discharged from the winding units are conveyed to the apparatus of the present invention for their ordered accumulation; 12a is an arrow which indicates the direction and sense of advancement of the conveyor belt 12 during the stage in which bobbins are fed onto the withdrawal preparation roller track 10; 14 is the blade which intercepts and arrests the bobbin 8 at the end of the roller track 10; 15 is the drive source which vertically moves the mobile support between its two end halt positions 2a and 2b. It consists of an actuator of pneumatic, hydraulic or electrical type or a combination of two or more of these types; 15a is an arrow indicating the direction and sense of vertical advancement of the mobile support when being positioned at 2a in front of the exit of the conveyor belt 12; 15b is an arrow indicating the direction and sense of vertical advancement of the mobile support when being positioned at 2b; 25 is the actuator which moves the bobbins 8 into their horizontal position prepared for withdrawal by the multi-engagement gripper; 16 is the upper straight-axis cross-member of the portal structure of the apparatus of the invention; 18 are the vertical-axis uprights of the portal structure of the apparatus of the present invention; 19 is the keyboard by which the operating data are fed in; 20 is a control unit based on a miniprocessor, of known type. It programs the operations in accordance with the instructions contained in the memory; 22 is the wheel-mounted container in which the yarn bobbins 8 are accumulated in ordered arrangement; 24 is the head of the textile winding machine.

The preferred embodiment of the invention is described hereinafter with reference to the figures of the accompanying drawings. The apparatus of the present invention is arranged to withdraw yarn bobbins from a textile winding machine operating on two faces, and to deposit them in ordered arrangement in a wheel-mounted container 22 of the type normally used in textile mills. In a preferred application, the apparatus is arranged to be placed at the head of a rotor spinning machine.

Additionally, a device of known type can be provided for automatically replacing a wheel-mounted container full of bobbins with an empty container.

The textile machine served by the automatic bobbin discharge apparatus of the present invention is provided with two bobbin collection and discharge conveyor belts, one for each face. This latter incorporates a plurality of winding units.

The machine is therefore provided with two bobbin discharge belts, one for each face, of which only one operates while the other remains at rest. Simultaneous operation is not possible. When a predetermined number N of bobbins are located on one of the belts, a signal is fed to the control unit 20 of the apparatus of the present invention, and this activates said belt 12 ready for the discharge of the bobbins 8 lying on it. The bobbin number N is previously chosen broadly equal to the number of bobbins to be loaded in ordered arrangement in the wheel-mounted container 22. The operating cycle for preparing the bobbins on the roller track 10 for withdrawal commences only when a known sensor detects the presence of the wheel-mounted container 22 in the collection position. On verifying this state the control unit 20 activates the drive source for driving the conveyor belt 12 with the result that this moves with its upper branch advancing in the direction and sense indicated by the arrow 12a.

Figure 5:
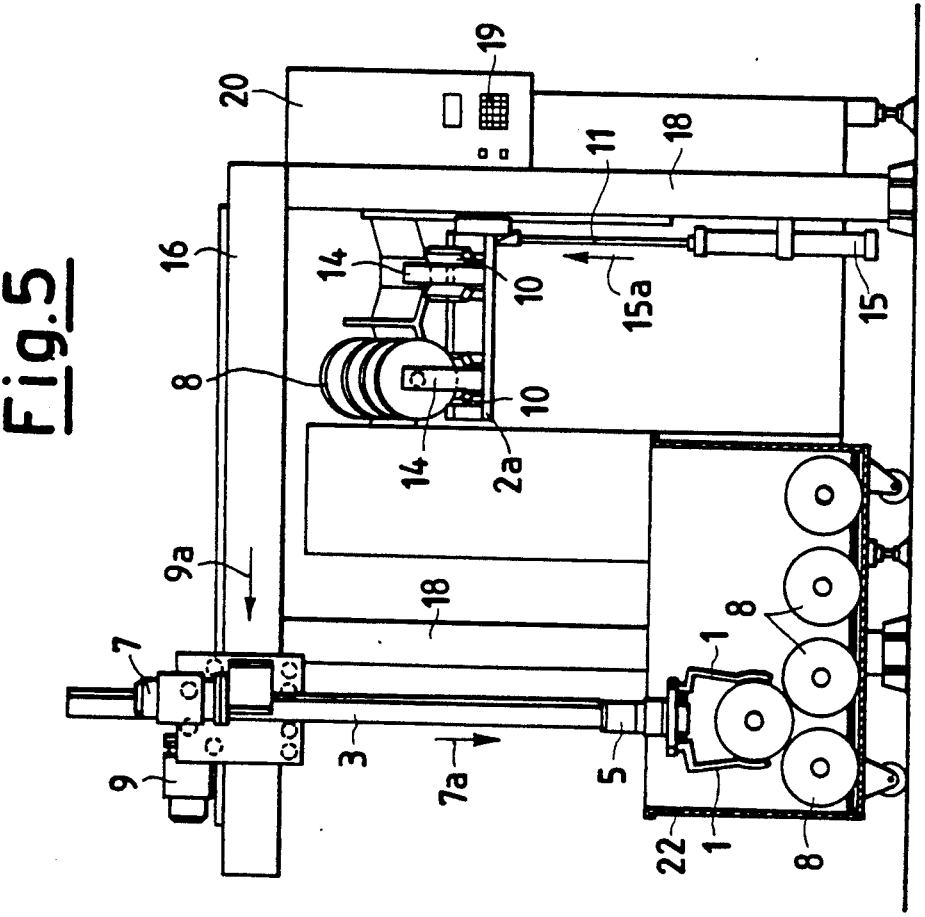
FIG. 5 is a diagrammatic front view of the apparatus of the present invention showing the operational configuration during the deposition of bobbins on those already accumulated in ordered arrangement in the wheel-mounted container and the simultaneous conveying of other bobbins onto the roller track in order to prepare them for the next withdrawal stage.

The bobbins 8 disengage from the conveyor belt 12 and slide by inertia and gravity along the fixed inclined-plane guide section 4 to reach the cradle-shaped roller track 10 and commence the preparation of four bobbins 8a, 8b, 8c, 8d, one behind the other on said roller track 10, for withdrawal. The interception element 14 consists of a blade which halts the bobbin 8a at the end of the roller track 10. The sensor-counter block 6 positioned in proximity to the end of the conveyor belt 12 counts the bobbins which pass, and each time four pass it produces a signal which causes said conveyor belt 12 to stop. The four bobbins which have passed form on the inclined roller track 10 a group representing a single entity for handling purposes. The formation of the group of bobbins with the mobile support stationed in its inclined position 2a in front of the exit of the conveyor belt 12 is illustrated diagrammatically in FIGS. 1 and 2. When the conveyor belt is at rest, the operating cycle involving withdrawal and deposition in an ordered arrangement takes place in the following operational stages:

activation of the drive source 15 so that its rod 11 vertically moves the mobile support from the upper halt position 2a to the lower halt position 2b, it being also subjected during this descent to an angular rotation about a horizontal axis 26 by means of an actuator 25, this rotation being required in order to move it from the inclined state to the horizontal state;

confirmation by sensors that the mobile slide has reached its lower horizontal halt position and thus the group of bobbins 8 has assumed its correct position lodged in the roller track 10, followed by activation of the drive source 9;

translation of the pendant arm 3 in the direction of the arrow 9b to position the multi-engagement gripper vertically above the underlying group of bobbins 8 (see FIG. 3 and FIG. 4). When this translation has taken place the drive source 7 is activated;

vertical descent of the pendant arm 3 in accordance with the arrow 7b until the multi-engagement gripper embraces the group of bobbins 8. Termination of the descent movement is determined by the instruction sequence which constitutes the operating program on termination of this descent, a signal activates the actuator and lever system for closing the gripper blades 1 of the multi-engagement gripper;

tightening of the gripper blades 1 about the outer surface of the bobbins 8 under elastic pressure. Activation of the drive source 7 and vertical raising of the pendant arm 3 through a short distance sufficient for the bobbins 8 not to interfere with the depressed surface of the roller track 10. On completion of raising, the drive source 9 is activated;

translation of the pendant arm 3 in accordance with the arrow 9a to position the group of bobbins 8 vertically above the determined row for their discharge into ordered accumulation (see FIG. 5 and FIG. 6).

Simultaneously with said translation, the drive source 15 is activated at a suitably timed moment such as to prevent interference between the multi-engagement gripper and the rising mobile slide, and by means of its rod 11 vertically moves the mobile support from the lower halt position 2b to the upper halt position 2a and imposes the required inclination on it during this raising movement. When this raising is complete and the roller track 10 is extending from the exit of the conveyor belt 12, the drive source for the conveyor belt 12 is activated so that the upper branch of this latter moves in the direction and sense indicated by the arrow 12a, to again feed a group of bobbins 8a, 8b, 8c, 8d onto the roller track 10.

When the movement indicated by 9a is complete, the pendant arm 3 descends vertically in accordance with the arrow 7a and the bobbins 8 are released in a position calculated by the control unit 20. Said release is obtained by activating the actuator and lever system for opening the elastic gripper blades 1 of the multi-engagement gripper.

The multi-engagement gripper is returned to its position for withdrawing the new group of bobbins which in the meantime has formed on the roller track 10 of the mobile slide, and the next operating cycle then proceeds, involving withdrawal followed by deposition in accordance with the new deposition coordinates calculated by the control unit 20.

When the control unit 20 has implemented the number of operating cycles required to complete the ordered accumulation of the bobbins 8, a luminous or other warning signal indicates that the wheel-mounted container 22 is full, this signal ceasing when this latter has been replaced. Although the invention has been described in terms of withdrawing, transferring and arranging textile bobbins originating from two conveyor belts of the rotor spinning machine, it can be advantageously applied to any bobbin production machine or can be applied in the terminal regions of internal bobbin transportation systems within the mill and therefore serve several winding machines.

A preferred embodiment has been described herein. It is however apparent that other embodiments are possible which fall within the scope of the present invention.

Thus the number and form of the gripper blades of the multi-engagement grippers can be varied and different drive arrangements can be provided; it is also possible to use a single drive source instead of the two drive sources 7 and 9; it is likewise possible to add or subtract drive sources in order to advantageously coordinate the combination of the various operating stages.

These and other modifications are possible without leaving the scope of the invention.

I claim:

1. A method of transferring bobbins from a conveyor belt of a textile machine to a container in an ordered arrangement, comprising:
   (a) feeding a predetermined number of the bobbins from the conveyor to a cradle shaped support element positioned at a slightly downward incline from the exit end of the conveyor belt, wherein said predetermined number of bobbins slide by gravity to abut one another on said support element, and wherein said support element comprises roller tracks;
   (b) simultaneously vertically downwardly translating and angularly rotating said cradle shaped roller tracks so the bobbins rest horizontally;
   (c) closing and tightening in several positions about the outer surface of the bobbins in rotational symmetry by a gripping means;
   (d) withdrawing a group of gripped bobbins and depositing said group of gripped bobbins in the ordered arrangement in the container in a discharge region wherein said deposition is by means of coordinated vertical and horizontal movements of drive means of said gripping means by means of a control unit.

2. A device for transferring bobbins from a conveyor belt of a textile machine to a container in an ordered arrangement, comprising:
   (a) a forwardly inclined mobile support unit, said support unit including at least one cradle-shaped roller track rigidly fixed to said support unit for laterally guiding the bobbins from the conveyor belt and a sensor-counter for activating said support unit, wherein said support unit translates vertically and rotates angularly for bringing the bobbins in a position for the transfer to the container;
   (b) a portal manipulator unit having a pendant arm, a drive means, and a control unit, wherein said pendant arm further comprises a gripper mechanism for positioning at least two of the bobbins from said transfer position to the ordered arrangement in the container by means of vertical and horizontal translation of said gripper by said drive means, controlled by said control unit.

3. The device of claim 2, wherein said mobile support unit further comprises means for bringing said support unit from said inclined position when the bobbins are laterally guided from the conveyor belt to a horizontal position when the bobbins are in said transfer position.

4. The device of claims 2 or 3 wherein said roller track of said support unit has a substantially V-shaped cross-section for cradling the bobbins.

* * * * *